US008554167B2

(12) United States Patent
Geary et al.

(10) Patent No.: US 8,554,167 B2
(45) Date of Patent: *Oct. 8, 2013

(54) WIRELESS DEVICE, METHOD OF OPERATION AND COMPUTER PROGRAM

(75) Inventors: Stuart Ian Geary, Fleet (GB); Nguyen Quan Tat, Reading (GB); Andrew Bishop, Guildford (GB); Graham Alexander Charles, Fleet (GB); Sami Jutila, Oulu (FI); Jari Juhani Ruohonen, Tampere (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/348,042

(22) Filed: Jan. 11, 2012

(65) Prior Publication Data

US 2013/0005291 A1  Jan. 3, 2013

Related U.S. Application Data

(63) Continuation of application No. 13/170,868, filed on Jun. 28, 2011.

(30) Foreign Application Priority Data

Jun. 28, 2011  (GB) .................................. 1110967.5

(51) Int. Cl.
| H04B 1/16 | (2006.01) |
| H04B 1/38 | (2006.01) |
| H04M 1/00 | (2006.01) |
| H04W 4/00 | (2009.01) |
| G08C 17/00 | (2006.01) |
| H04L 12/66 | (2006.01) |

(52) U.S. Cl.
USPC .................. 455/343.3; 455/552.1; 455/553.1; 455/558; 455/432.1; 370/311; 370/338; 370/352

(58) Field of Classification Search
USPC ................... 455/404.1, 558, 435.2, 574, 551, 455/436–444, 432.1, 525, 456.3, 552.1–553.1, 455/343.2–343.5; 370/310, 345, 254, 351, 370/328, 331–334, 338, 353, 401
See application file for complete search history.

(56) References Cited

U.S. PATENT DOCUMENTS

| 7,593,365 B1 * | 9/2009 | Delker et al. ................. 370/328 |
| 2005/0107109 A1 * | 5/2005 | Gunaratnam et al. ........ 455/525 |

(Continued)

FOREIGN PATENT DOCUMENTS

| EP | 1 679 917 A2 | 7/2006 |
| EP | 2 082 587 A1 | 7/2009 |

(Continued)

OTHER PUBLICATIONS

Combined Search and Examination Report from GB Application No. 1110967.5, dated Oct. 19, 2011 (4 pgs.).

*Primary Examiner* — Mahendra Patel
*Assistant Examiner* — Michael Mapa
(74) *Attorney, Agent, or Firm* — Alston & Bird LLP (57) ABSTRACT

A wireless device has two or more radio systems and SIM channels. At least a part of the first radio system can be shut down to reduce the power consumed by the device. This occurs if the first radio system is unable to obtain suitable service for the first SIM channel and the second radio system is at least one of (i) providing at least some service on the second SIM channel for the device, and (ii) capable of searching for service for the first radio system.

22 Claims, 3 Drawing Sheets

(56) References Cited

U.S. PATENT DOCUMENTS

| | | |
|---|---|---|
| 2006/0030290 A1* | 2/2006 | Rudolf et al. ............. 455/404.1 |
| 2007/0091847 A1* | 4/2007 | Lee ............................ 370/331 |
| 2010/0173671 A1 | 7/2010 | Cha |
| 2010/0273524 A1 | 10/2010 | Bae et al. |
| 2010/0278117 A1* | 11/2010 | Sharma et al. ............. 370/329 |
| 2011/0077031 A1* | 3/2011 | Kim et al. .................... 455/458 |
| 2011/0117909 A1* | 5/2011 | Cao et al. .................... 455/423 |
| 2011/0269503 A1 | 11/2011 | Park et al. |

FOREIGN PATENT DOCUMENTS

| | | |
|---|---|---|
| EP | 2 302 973 A1 | 3/2011 |
| WO | WO-2008/063993 A1 | 5/2008 |
| WO | WO 2010140781 A2 | 12/2010 |
| WO | WO-2011/041406 A1 | 4/2011 |

* cited by examiner

WIRELESS DEVICE, METHOD OF OPERATION AND COMPUTER PROGRAM

CROSS REFERENCE TO RELATED APPLICATIONS

This application is a continuation of U.S. application Ser. No. 13/170,868, filed on Jun. 28, 2011, which is hereby incorporated herein in its entirety by reference. This application also claims the benefit of and priority to United Kingdom application number 1110967.5, filed on Jun. 28, 2011.

FIELD OF THE INVENTION

The present invention relates to a wireless device, a method of operating a wireless device and a computer program for operating a wireless device.

BACKGROUND OF THE INVENTION

A multi-SIM (subscriber identity module) wireless device, including particularly mobile devices such as mobile phones (including so-called "smart phones"), personal digital assistants, tablet and laptop computers, etc., can hold two or more SIM cards. Currently, such devices can typically hold two SIM cards, though phones that can hold three SIM cards are now available and it is likely that phones and other wireless devices that can hold more SIM cards will become available. It is mentioned here that there are proposals to replace SIM cards with SIM functionality provided by software in the device. Reference will be made in this specification generally to "SIM" to mean that part of a device that provides for the subscriber identity module functionality whether provided by a physical card, software elsewhere in the device, or any other suitable arrangement. In addition, for simplicity and brevity, reference will often be made in this specification to a dual-SIM device, which can operate with two networks and/or tariff arrangements, etc., but it will be understood that much of what is described herein can be applied to a multi SIM wireless device having in principle any number of SIMs for operating with a corresponding number of networks and/or tariff arrangements, etc.

Dual-SIM operation allows the use of two services without the need to carry two devices at the same time. For example, the same handset can be used for business and private use with separate numbers and bills. As another example, the same handset can be used for travel, with one SIM being for use in the home country and the other SIM being for the country visited. As another example, both SIMs may be used with the same network operator, for example to achieve a higher total bandwidth for data connections. As yet another example, the device may contain both cellular and non-cellular radios which are used for voice and data communication respectively using the different SIMs. In any event, using multiple SIMs allows the user to take advantage of different pricing plans for calls and text messages to certain destinations as well as mobile data usage, and/or to keep personal and business use separate for example, and/or to achieve higher bandwidth, and/or to obtain coverage across different networks using a single handset. With this multiple SIM functionality, the SIMs can in general be from any network operator. The embodiments described herein are particularly concerned with mobile wireless devices that have two (or more) SIMs and radio systems which can be used simultaneously, and thus allow for example a user to send or receive data whilst making a voice call, and/or to have plural voice calls active simultaneously, and/or to have plural data calls active simultaneously, all on the one device and using the separate radio systems.

It can be expected that in practice, one of the two SIMs in these examples will spend a significant amount of time out of suitable service. Suitable service is allowed service on the home network, an equivalent network or an allowed roaming network. The typical states for the SIM in such a case are performing searches to return to suitable service and/or camping on an acceptable network to at least provide emergency service. However, even in these states, considerable power is consumed by the SIM channel, particularly by the receiver components (which in general will include the antenna(s), radio frequency system, processor system, etc. servicing the SIM channel for that SIM). It may be noted here that these states are often called "idle" states even though the SIM channel is consuming power. A particular problem with a dual (or more) SIM device is the high level of power consumed by the device, particularly for those that duplicate the radio hardware, software, firmware, etc.

SUMMARY OF THE INVENTION

In accordance with a first aspect of the present invention, there is provided a method of operating a wireless device having at least a first radio system for a first SIM channel and a second radio system for a second SIM channel, the method comprising: determining whether a first radio system of the wireless device is unable to obtain suitable service for the first SIM channel; and, shutting down at least a part of the first radio system to reduce the power consumed by the device if the first radio system is unable to obtain suitable service for the first SIM channel and a second radio system of the wireless device is at least one of: (i) providing at least some service on the second SIM channel for the device, and (ii) capable of searching for service for the first radio system.

The present invention recognises that having a radio system fully powered and operating in a wireless device when it is unable to find suitable service for the corresponding SIM channel can consume power unnecessarily. This can be the case if for example the other radio system and SIM channel is already providing at least some service, including as a particular example emergency service (which is a legal requirement in many countries for many wireless devices, such as mobile phones, etc. and is desirable in any event). Another example is where the other radio system can look for service for the first radio system and therefore there is nothing to be gained by also having the first radio system looking for its own service. A particular case where this may be relevant is where the other radio system has at least an equal ability to find service as the first radio. This may be when the two radio systems use the same frequency and network protocol, etc., and perhaps are even camped on the same network cell (for example in idle mode). The radio systems can in this sense be regarded as "symmetric". Another particular case is where the radio capabilities of the first radio system can be regarded as a subset of those of the other radio system. In either case, there is nothing to be gained by having both radio systems operating fully in the case that one of them is unable to find suitable service because the other radio system will or can sweep the same frequency bands, etc. that would be used by the first radio system. It may be noted that there will be situations, including those just described, where the other radio system is both capable of searching for service for the first radio system and providing at least some service (such as emergency service as a particular example) for the device.

In any event, the preferred embodiments of the present invention allow significant power savings to be made by shutting down at least part of the radio system supporting the out-of-service SIM. For example, search procedures, memory retention operations, leakage through logic gates and clocks will all consume power when the receiver is operating and powering or shutting down at least some of these will save power. Preferably, as much of the radio system as possible is shut down and is shut down as far as possible, as discussed further below.

Suitable service is allowed service on the home network, an equivalent network or an allowed roaming network. The typical states for the SIM in such a case are performing searches to return to suitable service and/or camping on an acceptable network to at least provide emergency service. In the context of the present specification, "shut down" will be understood to include any operation that reduces the power consumption, and may include for example simply shutting off clocks to a processor, In an embodiment, the method comprises the second radio system searching for suitable service for the first SIM channel whilst said at least part of the first radio system is shut down. Such searching often can be accommodated within normal operation of the second radio system without affecting the normal operation of the second radio system. An example is when the second radio system is in an idle state (i.e. not being used actively for a voice or data call for example).

In an embodiment, the method comprises resuming the first radio system if the second radio system locates suitable service for the first SIM channel. In this case, it can be useful for the second radio system to deliver information to the first radio system about the service that has been found, i.e. the second radio system can deliver (or give access for) the required context (i.e. the frequency band and other configuration and state information, etc. for the network) so that the first radio system does not need to search for the service itself, which speeds the resumption process.

In an embodiment, the method comprises resuming the first radio system if the second radio system becomes unable to search for suitable service for the first SIM channel. This may be necessary if for example the second radio system goes to an active state, such as being used for a voice or data call.

In an embodiment, the second radio system searches periodically for suitable service for the first SIM channel whilst said at least part of the first radio system is shut down, comprising using a first time period between consecutive searches if it is determined that the wireless device is stationary and using a second time period between consecutive searches if it is determined that the wireless device is moving, the second time period being shorter than the first time period. This enables a further power saving as it is deemed less likely that suitable service will be found for the first SIM channel if the device is stationary rather than moving, and so searching is minimised when the device is stationary.

In an embodiment, the method comprises resuming the first radio system if the second radio system becomes unable to provide emergency service. This allows the first radio system to search for at least emergency service, maximising the chance that it will be found. This may be particularly the case if the radio systems are not "symmetric" as the first radio system will be searching on different frequencies and/or network operators and/or different protocols from those used by the second radio system, or because different antenna arrangements are used in the device for the two radio systems.

According to a second aspect of the present invention, there is provided a wireless device, the device comprising: at least a first radio system for a first SIM channel and a second radio system for a second SIM channel; and, a processing system; the processing system being arranged to determine whether the first radio system is unable to obtain suitable service for the first SIM channel; and, the processing system being arranged to shut down at least a part of the first radio system to reduce the power consumed by the device if the first radio system is unable to obtain suitable service for the first SIM channel and a second radio system of the wireless device is at least one of: (i) providing at least some service on the second SIM channel for the device, and (ii) capable of searching for service for the first radio system.

According to a third aspect of the present invention, there is provided a computer program comprising code such that when the computer program is executed on a computing device, the computing device is arranged to: determine whether a first radio system of a wireless device is unable to obtain suitable service for a first SIM channel; and, shut down at least a part of the first radio system to reduce the power consumed by the device if the first radio system is unable to obtain suitable service for the first SIM channel and a second radio system of the wireless device is at least one of: (i) providing at least some service on the second SIM channel for the device, and (ii) capable of searching for service for the first radio system.

There is also provided a processing system for a wireless device having at least a first radio system for a first SIM channel and a second radio system for a second SIM channel, the processing system being arranged to cause a said wireless device to carry to a method according as described above.

Further features and advantages of the invention will become apparent from the following description of preferred embodiments of the invention, given by way of example only, which is made with reference to the accompanying drawings.

DETAILED DESCRIPTION OF THE INVENTION

Again, for simplicity, reference will typically be made in the following description to a dual-SIM wireless device (which includes particularly mobile devices, including mobile phones (including so-called "smart phones"), personal digital assistants, tablet and laptop computers, etc.), which can hold or cater for two SIMs and correspondingly has two radio systems, one for each SIM. It will be understood however that these principles can be applied to a multi-SIM wireless device having more than two SIMs (and typically a corresponding number of radio systems).

Figure 1:
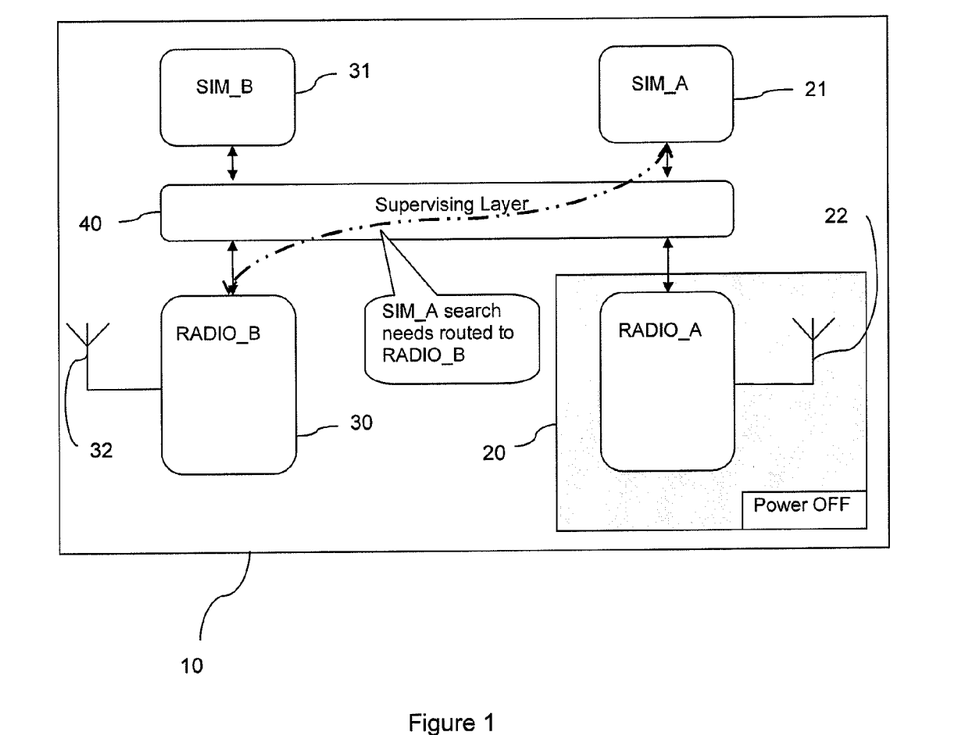
FIG. 1 shows schematically an example of a dual-SIM wireless device according to an embodiment of the present invention.

Referring initially to FIG. 1, a dual-SIM wireless device 10 has a radio front end 20,30 for each of two SIMs 21,31. Each radio front end 20,30 has its own respective antenna or set of antennas 22,32. Each radio front end 20,30 receives and transmits signals for the SIM channels corresponding to the respective SIMs 21,31 via circuitry 40 shown generically and schematically in the diagram. In general, the radio front ends 20,30 may provide the physical layer, baseband, MAC (media access control) and link layer control for the two SIM channels and the circuitry 40 may host the application layers of the device 10. Other arrangements are possible, such as the radio front ends 20,30 providing the physical layer and baseband control and the circuitry 40 or some other common part providing MAC and link layer control. As another alternative, there may be a common baseband block for both radio front ends 20,30. In any event, the circuitry 40 provides a supervisory layer for overall control of the radio front ends 20,30 and the associated circuitry as discussed further below. It will be understood that the radio front ends 20,30 and the circuitry 40 may in practice by implemented by one or more silicon chips or chipsets. The control may be typically as a software implementation, though a hardware or combination of software and hardware implementation is also possible. The term "radio system" will typically be used in this specification to refer to one or more of the radio front end, antenna(s), and relevant processing circuitry and software for a particular SIM channel (i.e. the hardware, software and/or firmware providing service in the device 10 for a particular SIM 21,31). In at least some circumstances, the term "radio system" is used to refer to all of the components for a particular SIM channel in the device 10. The two SIMs 21,31 and their respective channels and associated circuitry and antennas are generally designated by "A" and "B" in this description and the drawings.

Examples of operation of the device 10 will now be given with reference to FIGS. 2A, 2B and 3.

Figure 2A:
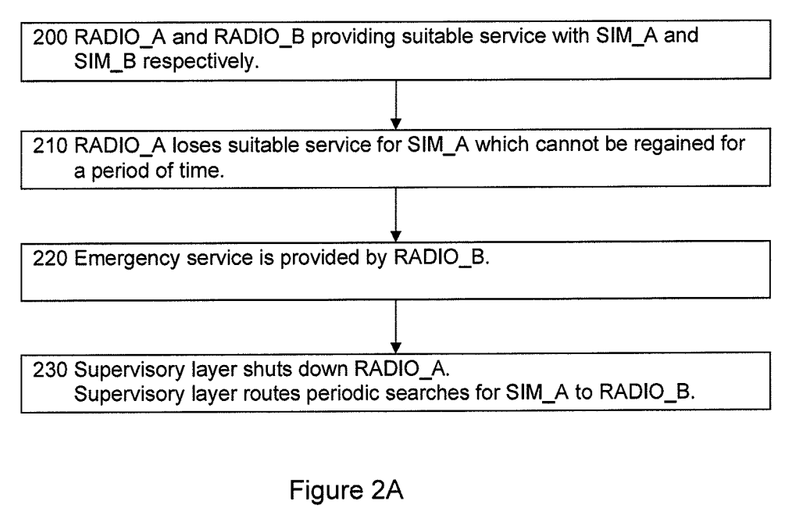
FIGS. 2A and 2B show flow diagrams of steps involved in two examples of at least partially shutting down a radio system of the device.

Referring first to step 200 in FIG. 2A, in this embodiment, initially the two radio systems RADIO_A and RADIO_B are providing suitable service for the SIM channels corresponding to their respective SIMs SIM_A and SIM_B. "Suitable service" is allowed service on the home network, an equivalent network or an allowed roaming network.

In step 210, it is determined that RADIO_A has lost suitable service for SIM_A. This may be determined by the supervisory layer in the circuitry 40 detecting or being informed that RADIO_A has lost suitable service for SIM_A and has not been able to regain suitable service for a predetermined period of time (which may be for example tens of seconds or perhaps a few minutes) or after a predetermined number of attempts to regain suitable service. It should be noted that even though RADIO_A has lost suitable service, at this time it may nevertheless be searching for any service and/or camped on an acceptable network cell to provide emergency service.

In step 220, the supervisory layer in the circuitry 40 notes that SIM_B and RADIO_B are providing at least emergency service (in an idle camped state).

As a result of it being determined that RADIO_A has lost suitable service for SIM_A in step 210 and that SIM_B and RADIO_B are providing at least emergency service in step 220, in step 230 at least part of RADIO_A is shut down by the supervisory layer in the circuitry 40. In addition, in this example, the supervisory layer routes periodic searches for SIM_A to RADIO_B so that RADIO_B takes over trying to find suitable service for SIM_A. RADIO_B typically uses the PLMN (public land mobile network) of SIM_A as the target and operates as per the normal cellular procedures for PLMN searching. These searches are performed while maintaining idle camping procedures on SIM_B, including providing at least emergency service for the device 10. The time between searches can be set to a suitable period to avoid fast battery drain. This search period may also be adaptive taking into account, for example, detection of movement by RADIO_B and/or the device 10 generally to further save power. A shorter time period may be used if it is determined that RADIO_B is moving and a longer time period used if RADIO_B is stationary as in practice it less likely that suitable service will be found for the first radio system if the device is stationary rather than moving, and so searching is minimised when the device is stationary. In addition, if RADIO_B is not moving, RADIO_B may sweep over a smaller number or range of frequencies again to minimise power usage. Detection of mobility by RADIO_B and/or the device 10 generally can be made in a number of ways, such as by detecting a change in received signal strength or seeing new neighbouring network cells at RADIO_B, changes in frequency owing to the Doppler effect (particularly if moving fast such as in a moving vehicle), use of GPS signals in a GPS-equipped device, etc.

Figure 2B:
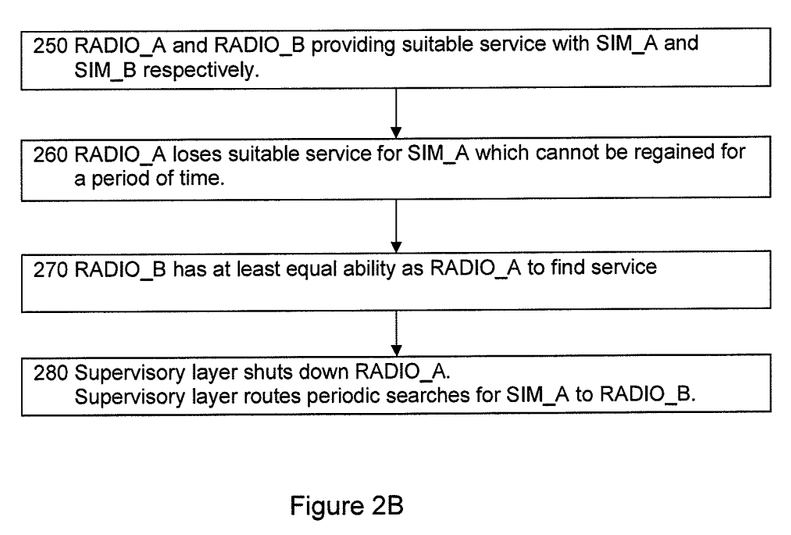

Referring now to step 250 in FIG. 2B, in this embodiment, again the two radio systems RADIO_A and RADIO_B are initially providing suitable service for the SIM channels corresponding to their respective SIMs SIM_A and SIM_B.

In step 260, it is determined that RADIO_A has lost suitable service for SIM_A. As above, this may be determined by the supervisory layer in the circuitry 40 detecting or being informed that RADIO_A has lost suitable service for SIM_A and has not been able to regain suitable service for a predetermined period of time (which may be for example tens of seconds or perhaps a few minutes) or after a predetermined number of attempts to regain suitable service. It should be noted that even though RADIO_A has lost suitable service, at this time it may nevertheless be searching for any service and/or camped on an acceptable network cell to provide emergency service.

In step 270, the supervisory layer in the circuitry 40 notes that RADIO_B has at least an equal ability to find service as RADIO_A. As noted above, this may for example be on the basis that RADIO_A and RADIO_B use the same frequency and network protocol, etc., and perhaps are even camped on the same network cell (for example in idle mode), or that the radio capabilities of RADIO_A can be regarded as a subset of those of RADIO_B.

In any event, as a result of it being determined that RADIO_A has lost suitable service for SIM_A in step 260 and that RADIO_B has at least an equal ability to find service as RADIO_A as noted in step 270, in step 280 at least part of RADIO_A is shut down by the supervisory layer in the circuitry 40. In addition, in this example, the supervisory layer again routes periodic searches for SIM_A to RADIO_B so that RADIO_B takes over trying to find suitable service for SIM_A. These searches may be carried out as described for the other embodiment above.

Figure 3:
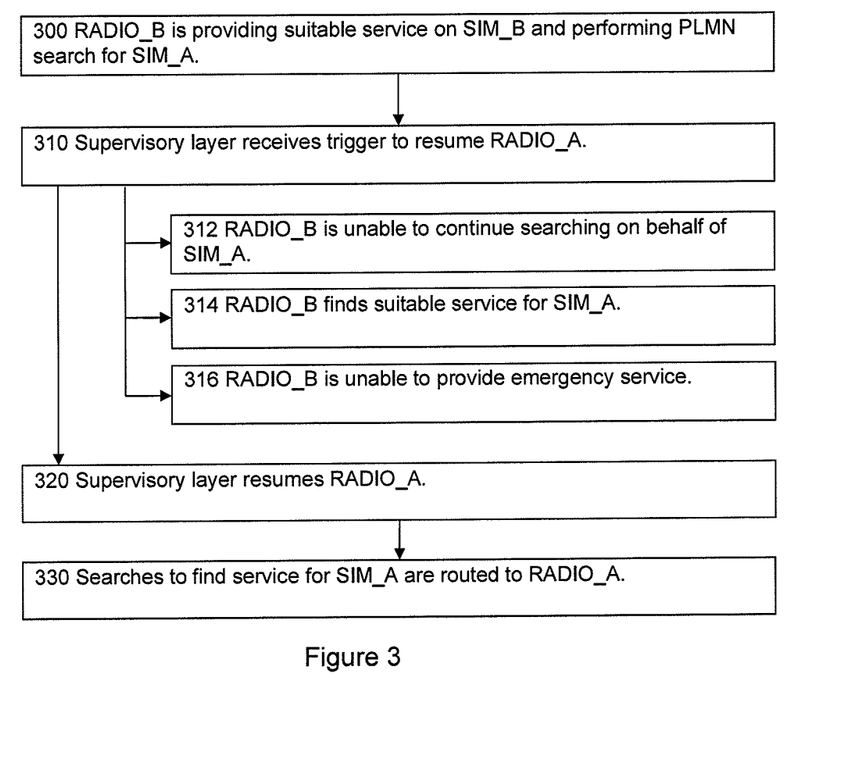
FIG. 3 shows a flow diagram of steps involved in an example of powering up a radio system of the device.

Referring now to FIG. 3, at step 300, in this example, initially RADIO_A has been at least partially shut down and RADIO_B is providing at least emergency service for the device 10 and typically also providing suitable service, and is also searching for suitable service for SIM_A.

At step 310, the supervisory layer in the circuitry 40 receives a trigger that indicates that RADIO_A should be powered up to resume providing service for SIM_A. A number of triggers may be used.

For example, as shown at 312, one trigger is that it is determined that RADIO_B is unable to continue searching for a suitable service for SIM_A. This may be because RADIO_B is no longer "idle" and is for example involved in a voice or data call (as indicated for example by a change in its RRC (radio resource control) state).

As another example, as shown at 314, a trigger may be that RADIO_B finds suitable service for SIM_A. This may be indicated in one embodiment by the PLMN search, which is being carried out by RADIO_B on behalf of SIM_A, returning network cells that match the desired PLMN or an equivalent PLMN. In this case, RADIO_B may deliver or at least provide access to the SIM context to RADIO_A as that will save time because RADIO_A will not have to carry out its own context acquisition process.

As yet another example, as shown at 316, a trigger may be that RADIO_B is unable to provide emergency service. This may occur if RADIO_B is itself unable to connect to a network (perhaps after a number of attempts, or after a predetermined period of time). In that case, it is desirable (and in some countries a legal requirement) that RADIO_A be powered up also to search for a network to provide at least emergency service, maximising the chance that it will be found (possibly because RADIO_A uses different frequency bands or network operator or protocol, or has a different antenna arrangement from RADIO_B). Other triggers may also be used.

In any event, in step 320, RADIO_A is commanded by the supervisory layer in the circuitry 40 to power up in order to resume providing service for SIM_A. Searches to find service for SIM_A are routed back to RADIO_A by the supervisory layer in the circuitry 40 in step 330.

The preferred embodiments of the present invention provide a dual SIM device that at least partially shuts or powers down one of its radio systems when that radio system is unable to find service for the corresponding SIM and when the other SIM and its radio system is already providing at least emergency service for the device, the other radio system searching for suitable service for the powered-down radio system. This provides for significant power savings without affecting or compromising normal operation of the wireless device and particularly without any or any significant reduction in service for the user. The shut down radio system is powered up as necessary or desirable.

It is mentioned above that (at least part of) the radio system that is unable to obtain suitable service is shut or powered down. Power saving methods which can be adopted will in practice depend on the specific hardware that is implemented and on certain functional criteria. For example, in general, processors, logic and receiver hardware can be put into a low power state by slowing down or suspending clock signals, although logic leakage typically still continues. To reduce consumption further, power domains may be implemented such that parts of the system can have power removed entirely. As mentioned, the device 10 may have entirely separate hardware (such as different baseband chips and radio front ends) for the two channels, and so one set can be fully powered down without affecting the other. If some parts are in common, for example the baseband logic of the two channels are on a common ASIC or other device, having different power domains for the logic or other hardware relating to the different channels may be particularly beneficial. Memory systems can be put into a low power retention state where the memory contents remain or can be shut down completely and the contents lost. A subset of the memories may be maintained to be available to enable a fast resume. By combinations of reducing the power state on some parts and removing power on other parts, the desired characteristics of reduced power consumption whilst maintaining a high resumption speed can be obtained and optimised for a particular implementation. It will be understood that in general, adding more power domains complicates the power supply arrangement and is minimised where possible.

In general terms, for this purpose, one or more of the components making up the radio system (such as the antenna(s), radio frequency system hardware components, processor system hardware components, etc.) for a SIM channel can be shut or powered down to a lower power state and preferably to the lowest power state that is available and appropriate. The "lowest power state" may be the state from which the radio system can be resumed in a reasonable time, particularly in the context of the three example trigger conditions mentioned above. For example, the speed to return to suitable service may be of the order of minutes. On the other hand, the speed to gain emergency service is more urgent, though tens of seconds is reasonable.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of processes according to the invention. The carrier may be any entity or device capable of carrying the program. For example, the carrier may comprise a storage medium, such as a ROM, for example a CD ROM or a semiconductor ROM, or a magnetic recording medium, for example a floppy disk or hard disk.

The above embodiments are to be understood as illustrative examples of the invention. Further embodiments of the invention are envisaged. For example, it is mentioned that in one embodiment the radio system RADIO_A providing suitable service performs searches for suitable service for the powered-down radio system RADIO_B while maintaining idle camping procedures on SIM_A, but the invention is not limited to RADIO_A being in an idle state for this purpose. The end user may define what is regarded as "suitable service" for the device 10. For example, the end user may configure the device 10 such that SIM_A is used only on the home network and roaming is allowed only with SIM_B. As another example, more than two SIMs and more than two radio systems may be employed in the device.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of operating a wireless device having at least a first radio system for a first subscriber identity module (SIM) channel and a second radio system for a second SIM channel, the method comprising:

determining whether a first radio system of the wireless device is unable to obtain suitable service for the first SIM channel;

shutting down at least a part of the first radio system to reduce the power consumed by the device if the first radio system is unable to obtain suitable service for the first SIM channel and a second radio system of the wireless device is at least one of: (i) providing at least some service on the second SIM channel for the device, and (ii) configured for searching for service for the first radio system;

searching with the second radio system for suitable service for the first SIM channel while said at least part of the first radio system is shut down and while the second radio system is in an idle camped state; and resuming the first radio system if the second radio system is no longer in the idle camped state and is involved in a voice or data call.

2. A method according to claim 1, comprising resuming the first radio system if the second radio system locates suitable service for the first SIM channel.

3. A method according to claim 1, wherein the second radio system searches periodically for suitable service for the first SIM channel whilst said at least part of the first radio system is shut down, comprising using a first time period between consecutive searches if it is determined that the wireless device is stationary and using a second time period between consecutive searches if it is determined that the wireless device is moving, the second time period being shorter than the first time period.

4. A method according to claim 1, wherein the at least some service includes at least emergency service for the device.

5. A method according to claim 1, comprising resuming the first radio system if the second radio system becomes unable to provide emergency service.

6. A processing system for a wireless device having at least a first radio system for a first subscriber identity module (SIM) channel and a second radio system for a second SIM channel, the processing system being arranged to cause a said wireless device to carry out a method according to claim 1.

7. A method according to claim 1, further comprising routing, within the wireless device, a search for the first SIM channel from the first radio system to the second radio system prior to searching with the second radio system for suitable service for the first SIM channel.

8. A method according to claim 1, further comprising:
resuming the first radio system if the second radio becomes unable to search for suitable service for the first SIM channel; and
causing SIM context or access to SIM context to be provided to the first radio system in conjunction with resumption of the first radio system.

9. A wireless device, the device comprising:
at least a first radio system for a first subscriber identity module (SIM) channel and a second radio system for a second SIM channel; and,
a processing system;
the processing system being arranged to determine whether the first radio system is unable to obtain suitable service for the first SIM channel;
the processing system being arranged to shut down at least a part of the first radio system to reduce the power consumed by the device if the first radio system is unable to obtain suitable service for the first SIM channel and a second radio system of the wireless device is at least one of: (i) providing at least some service on the second SIM channel for the device, and (ii) configured for searching for service for the first radio system; and
the processing system being further configured to cause the second radio system to search for suitable service for the first SIM channel while said at least part of the first radio system is shut down and while the second radio system is in an idle camped state,
wherein the processing system is arranged to resume the first radio system if the second radio system is no longer in the idle camped state and is involved in a voice or data call.

10. A device according to claim 9, wherein the processing system is arranged to resume the first radio system if the second radio system locates suitable service for the first SIM channel.

11. A device according to claim 9, wherein the second radio system is arranged to search periodically for suitable service for the first SIM channel whilst said at least part of the first radio system is shut down, the second radio system being arranged to use a first time period between consecutive searches if it is determined that the wireless device is stationary and to use a second time period between consecutive searches if it is determined that the wireless device is moving, the second time period being shorter than the first time period.

12. A device according to claim 9, wherein the at least some service includes at least emergency service for the device.

13. A device according to claim 9, wherein the processing system is arranged to resume the first radio system if the second radio system becomes unable to provide emergency service.

14. A device according to claim 9, wherein the processing system is further configured to route, within the wireless device, a search for the first SIM channel from the first radio system to the second radio system prior to searching with the second radio system for suitable service for the first SIM channel.

15. A device according to claim 9, wherein the processing system is further configured to:
resume the first radio system if the second radio becomes unable to search for suitable service for the first SIM channel; and
cause SIM context or access to SIM context to be provided to the first radio system in conjunction with resumption of the first radio system.

16. A computer program stored on a non-transitory computer readable medium comprising code such that when the computer program is executed on a computing device, the computing device is arranged to:
determine whether a first radio system of a wireless device is unable to obtain suitable service for a first subscriber identity module (SIM) channel;
shut down at least a part of the first radio system to reduce the power consumed by the device if the first radio system is unable to obtain suitable service for the first SIM channel and a second radio system of the wireless device is at least one of: (i) providing at least some service on the second SIM channel for the device, and (ii) configured for searching for service for the first radio system; and
cause the second radio system to search for suitable service for the first SIM channel while said at least part of the first radio system is shut down and while the second radio system is in an idle camped state,
wherein the code is such that the first radio system is resumed if the second radio system is no longer in the idle camped state and is involved in a voice or data call.

17. A computer program according to claim 16, wherein the code is such that the first radio system is resumed if the second radio system locates suitable service for the first SIM channel.

18. A computer program according to claim 16, wherein the code is such that the second radio system searches periodically for suitable service for the first SIM channel whilst said at least part of the first radio system is shut down, wherein a first time period is used between consecutive searches if it is determined that the wireless device is stationary and a second time period is used between consecutive searches if it is determined that the wireless device is moving, the second time period being shorter than the first time period.

19. A computer program according to claim 16, wherein the code is such that the at least some service includes at least emergency service for the device.

20. A computer program according to claim 16, wherein the code is such that the first radio system is resumed if the second radio system becomes unable to provide emergency service.

21. A computer program according to claim 16, wherein the code is such that the computing device is further configured to route, within the wireless device, a search for the first SIM channel from the first radio system to the second radio system prior to searching with the second radio system for suitable service for the first SIM channel.

22. A computer program according to claim 16, wherein the code is such that the computing device is further configured to:
   resume the first radio system if the second radio becomes unable to search for suitable service for the first SIM channel; and
   cause SIM context or access to SIM context to be provided to the first radio system in conjunction with resumption of the first radio system.

\* \* \* \* \*